Figure 1:
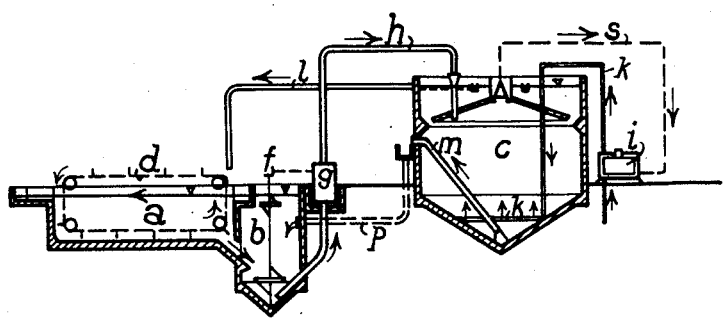

Sept. 1, 1931. K. IMHOFF 1,820,976

SEWAGE TREATMENT

Filed Nov. 9, 1927

Patented Sept. 1, 1931

1,820,976

UNITED STATES PATENT OFFICE

KARL IMHOFF, OF ESSEN, GERMANY

SEWAGE TREATMENT

Application filed November 9, 1927, Serial No. 232,168, and in Germany October 8, 1927.

In the usual apparatus for sewage treatment consisting of settling basins and separate digesting chambers for the sludge, it is practical to include mixing basins in which the fresh sludge from the settling basin is first impregnated with aged sludge before it is pumped into the sludge digestion chamber. In this manner one can prevent and delay in the fresh sludge an acid fermentation which in the sludge digestion chamber is very undesirable.

However, this arrangement has the disadvantage that the fresh sludge is very aqueous and an unnecessarily large quantity of sludge water is pumped with the sludge into the sludge digestion chamber. This disadvantage is especially great if the sludge digestion chamber is heated, because then the large amount of cold sludge water carries away a great deal of heat.

One can obviate this drawback by returning the surplus sludge water from the mixing space into the settling basins. This operation can be best effected by putting the mixing space immediately adjacent the settling basins and putting the two into communication so that the excess sludge water from the mixing space can always be conducted back to the settling basins in exchange for newly admitted sludge coming therefrom.

Other advantages of the invention will be made clear from the following description and the novel features pointed out in the appended claims.

If in said case the acid fermentation is tried to be obviated by removing the sludge from the sludge chamber at very short intervals for preventing a beginning of the acid fermentation at all, the whole sewage treatment must again become a failure due to the further drawback that then the water contents of the sludge and thus the quantity of sludge must be immensely increased, frequently to 10 times the normal quantity thereof. Thereby, also the secondary sludge digestion chamber is loaded much more than normally and must receive a considerably higher volume. Besides, the artificial heating becomes uneconomic, because the large unnecessary water quantities must be heated with the sludge; and further difficulties arise from the question of disposal of the outflowing sludge water.

The present invention provides improved means for overcoming said drawbacks while using comparatively small sludge chambers beneath the settling basins and in communication therewith, by regularly supplying to said sludge chambers good digesting sludge from secondary or other sludge digestion chambers and thereby keeping the sludge in said small sludge chambers in alkaline fermentation.

The small sludge chambers of a volume for receiving the sludge of several days, are thus still sufficiently large for permitting therein a separation of the main quantity of the excess sludge water from the mixture of fresh and digested sludge and its return to the settling basin, so that the sludge is poor of water if pumped into the secondary sludge digestion chamber.

Figure 2:
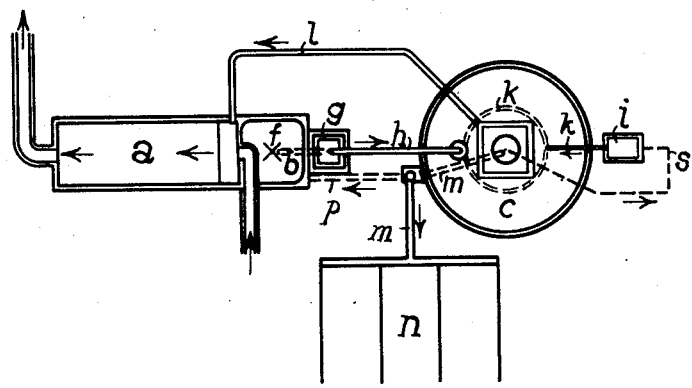

The accompanying drawings illustrate by way of example how the invention can be put into practice:

Figs. 1 and 2 are respectively a longitudinal vertical section through, and a plan view of, a two-storied settling and digestion tank with an adjacent secondary sludge digestion chamber, according to this invention.

The sludge in the settling basin $a$ is continuously or intermittently conveyed by an endless scraper $d$ toward the intake of the settling basin shown at $z$. In communication with the settling basin $a$ is the small sludge chamber $b$ of somewhat greater depth, of which the water contents can automatically mix with the sludge supplied from the settling basin. From an adjacent secondary sludge digestion chamber $c$, a certain quality of good sludge in alkaline methane fermentation therein, is regularly delivered through the conduits $m$ and $p$ into the sludge chamber $b$ and there temporarily mixed with the sludge therein. The mixture is again delivered to the secondary sludge digestion chamber $c$ through the pump $g$ and conduit $h$. Said secondary sludge digestion chamber is heated in a way known in the art from a heater $i$, to which the sludge gases can be supplied through a conduit *s* and used as a fuel, and from which an exhaust heating tube *k* leads into the bottom end of the secondary sludge digestion chamber. The digested sludge from the latter is conducted through the pipe *m* on to a drying place *n*, while a pipe *l* serves to return the excess sludge water to the settling basin *a*.

What I claim, is:

1. Apparatus for treating sewage having, with a combined two-chambered settling basin in which the water contents intermix, the second chamber being of greater depth than the first to enable a regular supply of good digesting sludge to move from the bottom of the first chamber and mix through the contents of the second chamber keeping the contents therein in alkaline fermentation, a separate secondary sludge basin for carrying through alkaline methane fermentation, and conduits for effecting an interchange of contents between the second chamber and secondary basin to enable good sludge in alkaline methane fermentation to be mixed with the mixture in the second chamber.

2. Apparatus for treating sewage having, with a combined two-chambered settling basin in which the water contents intermix, the second chamber being of greater depth than the first to enable a regular supply of good digesting sludge to move from the bottom of the first chamber and mix through the contents of the second chamber keeping the contents therein in alkaline fermentation, a separate secondary sludge basin for carrying through alkaline methane fermentation, conduits for effecting an interchange of contents between the second chamber and secondary basin to enable good sludge in alkaline methane fermentation to be mixed with the mixture in the second chamber, and means for returning excess activated sludge from the secondary basin to the first chamber.

3. Apparatus for treating sludge having, with a combined two-chambered settling basin, the second chamber of which is of greater depth than the first to enable a regular supply of good digesting sludge to move from the bottom of the first chamber and mix through the second chamber keeping the contents therein in an alkaline fermentation mixture, a separate secondary sludge basin for carrying through alkaline methane fermentation, conduits between the second chamber and secondary basin to pass an interchange of contents, moving from the bottom of the second chamber to the secondary basin and from the bottom of the secondary basin to the secondary chamber whereby temporarily to mix good sludge in alkaline methane fermentation with the mixture in the second chamber.

In testimony whereof I have hereunto set my hand.

KARL IMHOFF.